United States Patent [19]

Lehmann et al.

[11] Patent Number: 5,091,008
[45] Date of Patent: Feb. 25, 1992

[54] ELASTICALLY RESTORING POLYMER-MODIFIED BITUMEN (PMB)

[75] Inventors: Klaus-Dieter Lehmann, Heidenau; Michael Müller, Bensheim, both of Fed. Rep. of Germany

[73] Assignee: Röhm GmbH Chemische Fabrik, Darmstadt, Fed. Rep. of Germany

[21] Appl. No.: 531,332

[22] Filed: May 31, 1990

[30] Foreign Application Priority Data

Jun. 1, 1989 [DE] Fed. Rep. of Germany ....... 3917816
Aug. 4, 1989 [DE] Fed. Rep. of Germany ....... 3925827

[51] Int. Cl.$^5$ .......................... C08L 95/00; C09D 4/00; C09D 101/00; C09D 201/00
[52] U.S. Cl. .................................. 106/273.1; 106/277; 106/284.4; 106/668; 106/671
[58] Field of Search ..................... 106/668, 671, 273.1, 106/277, 819, 823, 284.4

[56] References Cited

U.S. PATENT DOCUMENTS 2,420,082  6/1947  Klinger .................. 260/28
2,848,429  3/1958  Woodruff et al. ............ 260/4

FOREIGN PATENT DOCUMENTS 1240773  5/1967  Fed. Rep. of Germany .
2509473  9/1976  Fed. Rep. of Germany .
1177425  1/1970  United Kingdom .
8706947  11/1986  World Int. Prop. O. .
8807067  9/1988  World Int. Prop. O. .

OTHER PUBLICATIONS

Korner et al; Plaste und Kautschuk 24 (1977) 475-8.
Ger-AS 12 40 773=CA 67:6634m.
Ger-OS 23 31 727 (Has no English Equivalent).
Ger-OS 25 09 473=CA 86:92998h.
Jap. OS 52-141829=CA 89:48110a.
PCT [OS] 88/07067.

*Primary Examiner*—Mark L. Bell
*Assistant Examiner*—Michael Marcheschi
*Attorney, Agent, or Firm*—Oblon, Spivak, McClelland, Maier & Neustadt

[57] ABSTRACT

A polymer-modified bitumen (PmB) having improved elastic restoration and having a content of 0.5-20 wt. % of polymer components which polymer components are comprised to the extent of at least 20 wt. % of polyalkyl (meth)acrylates having molecular weights greater than 30,000, said polyalkyl (meth)acrylate being comprised of 50-99.8 wt. % of alkyl (meth)acrylates having alkyl groups of 8-26 C atoms, 0.1-2.8 wt. % of polymerizable carboxylic acids, 0.1-2.8 wt. % of polymerizable basic nitrogen compounds; and 0-49.8 wt. % of one or more other polymerizable compounds each having not more than one polymerizable double bond.

13 Claims, No Drawings

ELASTICALLY RESTORING POLYMER-MODIFIED BITUMEN (PMB)

BACKGROUND OF THE INVENTION

1. Field of the Invention

The present invention relates to polymers based on polyalkyl (meth)acrylates, for use as bitumen improving agents; and to bitumen modified with such polymers and having improved engineering properties.

2. Background of the Invention

Bitumen, which is a mixture of essentially different hydrocarbons including varying amounts of paraffinic, naphthenic, and aromatic hydrocarbons, has properties which make it useful in many applications such as a component in road surfaces, as a sealing compound, as a coating material or in the form of tar paper or the like, to protect building structures, and as a caulking or waterproofing material or the like, to protect against ground water.

Bitumen has little or no elasticity. The elasticity which a given bitumen possesses depends on the crude oil from which it is produced. Because of its inherent properties, coatings or pavement layers comprised of bitumen are brittle at low temperatures and soft at higher temperatures.

Attempts have been made to incorporate various additives, particularly polymers, into bitumen, particularly in order to improve its rheological properties such that, e.g., a resulting asphalt, viz. a mixture containing the improved bitumen and minerals and used principally in roadbuilding, has sufficient stability and cold flexibility, as well as high fatigue strength under constantly increasing traffic loads. Polymer addition can increase the so-called plasticity range, i.e., the difference between the softening point and the failure point. If the failure point (DIN 52 012) is lowered and the ductility (DIN 52 013) is raised, improvement of cold flexibility is indicated. The objective of using polymers as bitumen additives is to alter the viscoelastic properties of bitumen, in particular to extend the plasticity range and to improve the elastic restoration.

In addition to natural and synthetic rubbers, other polymers which have been tested as bitumen improvers are duroplastic resins and thermoplastic resins (Koerner et al, 1977 Plaste und Kautschuk, 24, 475–478). Principal polymers currently used as bitumen additives are styrene/butadiene copolymers (SB), EPDM copolymers, ethylene/vinyl acetate copolymers (EVA), and atactic polypropylene, the latter being used particularly for industrial bitumen. Polymer-modified bitumens available commercially include Carabit ® (SB, supplied by Shell), Olexobit ® (EPDM supplied by BP), and Styrelf ® (SB supplied by Elf).

Other known bitumen improvers are polymers based on (meth)acrylic acid esters, particularly polymers of alkylmethacrylic acid esters (PAMAs). These polymers are still limited in their applicability, despite the fact that they satisfy a number of criteria as additives. The principal drawback which they have is that they do not sufficiently improve the elastic restoration of the finished elastomer-modified bitumen.

U.S. Pat. No. 2,420,082 describes bitumeniferous mixtures comprised of bitumen and 2-5% of polyalkyl methacrylates wherein the alkyl groups have 8-10 carbon atoms. The ductility of the bitumen is improved. Specific molecular weight data are not given.

U.S. Pat. No. 2,848,429 describes bitumeniferous mixtures with improved ductility, obtained by addition of rubber and polyalkyl (meth)acrylates, each in the amount of 0.01-0.5%. The PAMAs have molecular weights of 5,000-500,000.

Ger. AS 12 40 773 and OS 23 31 727 also describe improved bitumeniferous binders for road surfacing, which contain alkyl methacrylate polymers. No detailed or specific information about the polymers is given.

Polyalkyl (meth)acrylates and copolymers of alkyl (meth)acrylates have also been proposed as improvers for bitumen. The polymer described in Ger. OS 25 09 473 is a solid mixed polymer with molecular weights of 50,000-500,000, comprised essentially of monomer units of alkyl (meth)acrylates with alkyl groups containing more than 6 carbon atoms, 3-20 wt. % of acrylic or methacrylic acid, and 3-20 wt. % of basic nitrogen-containing compounds. In Japan OS 52-141,829, stagewise emulsion polymerized additives are described, and in PCT 88/07 067, polyalkyl methacrylates wherein the alkyl groups have 4-20 carbon atoms and with molecular weights of the polymers of c. 5,000-1,000,000 are described which are present in the bitumen in amounts of 0.0 to c. 10 wt. % to form a modified bitumen.

Criteria for candidates as polymeric additives for improvement of the properties of bitumeniferous mixtures are those polymers which improve the oxidation resistance and thermal stability of the polymer. Other important properties of the polymers include ease of incorporation into bitumen, compatibility with different types of bitumen, and stability of the bitumen-polymer mixture.

Known polymeric bitumen additives adequately improve the cold flexibility of bitumeniferous mixtures and the resulting mineral mixtures. The failure point and ductility of such materials are favorably affected by addition of known additives. However, the fatigue strength and elasticity of asphalts obtained with the known bitumeniferous binders are inadequate. These properties are determined by the elastic properties of the bitumen, as indicated, e.g., by severely deformed asphalt road surfaces encountered in practice. A need therefore continues to exist for an improved polymer for admixture with bitumen.

SUMMARY OF THE INVENTION

Accordingly, one object of the present invention is to provide a polymer additive which, when used in bitumeniferous mixtures, markedly improves the elastic properties, e.g., the elastic restoration of bitumen preparations, while also meeting the known and necessary criteria such as high thermal stability, oxidation resistance, and cold flexibility, easy incorporation and compatibility.

Briefly, this object and other objects of the present invention as hereinafter will become more readily apparent can be attained in a polymer-modified bitumen of improved elastic restoration having a content of from 0.5 to 20 wt. % of polymer components which polymer components are comprised to the extent of at least 20 wt. % of polyalkyl (meth)acrylates having molecular weights greater than 30,000, said polyalkyl (meth)acrylate being comprised of:

50-99.8 wt. % of alkyl (meth)acrylates having alkyl groups of 8-26 carbon atoms;

0.1-2.8 wt. % of polymerizable carboxylic acids;

0.-2.8 wt. % of polymerizable basic nitrogen compounds; and 0-49.8 wt. % of one or more other polymerizable compounds each having not more than one polymerizable double bond.

DETAILED DESCRIPTION OF THE PREFERRED EMBODIMENTS

It has now been discovered that polyalkyl (meth)acrylates having certain compositions are effective bitumen additives which improve the cold flexibility properties of bitumen and in particular improve the elastic properties of the bitumen and of bitumeniferous compositions. Surprisingly, it was now been found that high elasticity of polymer-modified bitumen is obtained with polymer additives comprised of polyalkyl (meth)acrylates which are esters of long-chained alkanoles and, carboxylic acids. The polymers are obtained by copolymerization with polymerizable carboxylic acids and/or polymerizable basic nitrogen compounds, with the latter-mentioned polymerizable acids and/or nitrogen compounds being present in the copolymer (or mixture of copolymers) in amounts of <3 wt. % each. The copolymer obtained has a molecular weight Mw of >30,000.

A polymer-modified bitumen with improved elastic restoration obtained via a content of 0.5-20 wt. % of polymeric constituents, which polymeric constituents are comprised of at least 20 wt. % of polyalkyl (meth)acrylates with molecular weights >30,000; characterized in that the polyalkyl (meth)acrylate is comprised of units as follows:

50-99.8 wt. % of alkyl (meth)acrylates with the alkyl groups having 8-26 carbon atoms;

0.1-2.8 wt. % of polymerizable carboxylic acids;

0.1-2.8 wt. % of polymerizable basic nitrogen compounds; and 0-49.8 wt. % of one or more other polymerizable compounds with not more than one polymerizable double bond.

The polyalkyl (meth)acrylate of the invention, having the prescribed compositions, may be a copolymer of the indicated comonomers or a mixture of copolymer of the indicated comonomers or a mixture of copolymers of alkyl (meth)acrylates with polymerizable carboxylic acids and/or polymerizable basic nitrogen compounds. The alkyl (meth)acrylate copolymers and/or mixtures of copolymers having compositions according to the invention may be added as solutions, e.g., in a suitable mineral oil or as an aqueous emulsion, or in pure form, to the bitumen or bitumeniferous mixtures.

As known from the state of the art, the addition of polyalkyl (meth)acrylates having molecular weights in the range of 50,000-1,000,000 can improve the cold flexibility of polymer-modified bitumen, as indicated by the failure point and ductility parameters. However, the elastic restoration is not adequately improved. The result is persistent deformation which occurs, e.g., in road surfaces, which presents substantial risks to traffic safety.

For example, the specification of the technical Terms of Delivery for finished polymer-modified bitumen, "TL PmB 88, Teil 1", edition of Dec. 30, 1988, requires elastic restoration of at least 50% for various types of polymer-modified bitumen.

The method used to demonstrate the elastic properties of finished elastomer-modified bitumen is the elastic restoration test according to the sheared fiber method in a ductilometer, which is based on the test of DIN 52 013, at 25° C. In a variation of this test, the test body is drawn only to a fiber length of 20 cm, and the fiber is cut into two fiber segments in its middle, using a scissors, within 10 sec after interruption of the advance. The elastic restoration is defined as the distance between the two ends of the fiber segments measured after 30 min. The parameter is stated in percent of the initial elongation.

The Examples and Comparative Examples which follow illustrate the low elastic restoration when pure polyalkyl (meth)acrylates with molecular weights <1,000,000 are used and the much higher restoration for the inventive PmBs (see Table 1).

The structure of the present copolymer additive comprised of (meth)acrylate esters is responsible for the good thermal stability, oxidation resistance, and solubility, i.e., easy incorporatability, exhibited by nearly all types of bitumen in which the copolymer is incorporated.

The monomers used to produce the alkyl (meth)acrylate copolymers of the invention are long-chain alkyl esters of acrylic and/or particularly methacrylic acid, with 8-26, particularly 8-20, advantageously 10-18 carbon atoms in the alkyl moiety of the ester group. Suitable examples of such (meth)acrylate esters include n-octyl methacrylate, 2-ethylhexyl acrylate, 2-ethylhexyl methacrylate, n-decyl methacrylate, isodecyl acrylate, isodecyl methacrylate, dodecyl methacrylate, octadecyl acrylate, octadecyl methacrylate, eicosyl methacrylate, and tricosyl methacrylate, wherewith the long-chain alcohols used to from the esters are preferably synthetic alcohols which generally are employed as mixtures of various alcohols in the 8-26 carbon atom range. Such alcohols are familiar commercially, particularly under the trade names Lorol ®, Alfol ®, Dobanol ®, and Behenyl SR ®. An example of a technical alcohol useful for producing isodecyl methacrylate is a mixture of isomeric isodecyl alcohols with a mean C-number (C) =9.9-10.3.

The bitumen-modifying polyalkyl (meth)acrylates are comprised of units as follows:

50-99.8 wt. %, preferably 60-99.5 wt. %, particularly preferably 80-99 wt. %, of long chain alkyl esters of acrylic acid and/or preferably of methacrylic acid, which esters have 8-26 carbon atoms in the ester group. Advantageously, the esters are mixtures of different $C_8$-$C_{26}$ alkyl esters.

The acidic and basic comonomer units are present in the copolymer, of the copolymers of the eventual mixtures, in amounts of <3 wt. % each, viz. 0.1-2.8 wt. %, preferably 0.2-2.5 wt. %, particularly preferably 0.5-2.0 wt. % each. It is possible to employ maleic acid, maleic anhydride, crotonic acid, or itaconic acid, as an acid comonomer, either exclusively or in combination with acrylic acid and/or methacrylic acid.

Basic monomer compounds which may be used are compounds with secondary or tertiary amino or amido groups, or with basic heterocyclic groups. Unsaturated compounds with primary amino groups generally inhibit the radical polymerization and therefore are unsuitable. However, unsaturated compounds with secondary amino groups, e.g. t-butylaminoalkyl esters of acrylic acid and/or methacrylic acid, are polymerizable if the hydrogen atom of the amino groups is sterically blocked. Preferred monomers having a basic nitrogen atom are dialkylaminoalkyl esters or dialkylaminoalkylamides of acrylic or methacrylic acid, in particular such esters or amides which have a total of 7–16 carbon atoms, or N-alkyl acrylamides or N-alkyl methacrylamides. Examples which may be mentioned include dimethylaminoethyl acrylate or -methacrylate, dimethylaminopropyl acrylate or -methacrylate, dimethylaminobutyl acrylate or -methacrylate, N-methylacrylamide, dimethylaminoethyl acrylamide or -methacrylamide, and similar esters or amides which contain, instead of a dimethylamino group, a diethylamino, dipropylamino, dibutylamino, methylamino, methylbutylamino, morpholino, or piperidino group. Suitable basic monomers also include vinylpyrrolidone, vinylpyridine, vinylimidazole, vinylimidazoline, vinylpyrazolone, vinylpiperidine, and acrylic or methacrylic acid esters of imidazolyl alkanols or imidazolinyl alkanols.

The copolymers may also contain monomer units of one or more other copolymerizable compounds with a single double bond, in amounts of 0–49.8 wt. %, particularly 0–20 wt. %. Examples of such nonessential monomers for preparing the inventive copolymers include acrylates (and/or methacrylates) of alcohols which alcohols have 1–7 carbon atoms, e.g., methyl methacrylate, isobutyl methacrylate, n-butyl acrylate, isoamyl methacrylate, and n-hexyl acrylate; also acrylonitrile, acrylamide, methacrylamide, styrene, and vinyl acetate.

The elastic-restoration-improving polymers can be incorporated into the bitumen in the form of (i) solutions, particularly in a suitable mineral oil such as a higher viscous naphthenic lubricating oil; (ii) aqueous emulsions; and (iii) in pure form.

Accordingly, the polyalkyl (meth)acrylates can be produced by customary techniques such as by radical polymerization of the monomers in solution or emulsion, or by mass polymerization (see Rauch-Puntigam, H., and Voelker, Th., 1967, "Acryl- und Methacrylverbindungen", pub. Springer-Verlag, Berlin, particularly pp. 203, 207, 230–233, 238, and 327). The molecular weight, which for the present polyalkyl (meth)acrylates should be >30,000, particularly >50,000, is chiefly controlled by the amount of the polymerization initiator employed in relation to the amount of the polymerizable monomers, or by the use of a regulator, e.g. an alkylmercaptan. The methods of controlling molecular weight are known. The molecular weight Mw (g/mol of the polymer produced) can be determined by the light scattering method ("Ullmanns Encyklopaedie der Technischen Chemie", 4th Ed., Vol. 15, pp. 385–387), or by the calibration method presented infra. Viscosities are measured according to DIN 7745, using chloroform as a solvent, at 20° C.

To modify a bitumen by the technique of the invention, the polyalkyl (meth)acrylates, which have acidic and basic groups in the molecule and molecular weights of >30,000, are added in amounts of 1–10 wt. %, particularly 2–8 wt. %. In addition to the present polyalkyl (meth)acrylates, the inventive polymer-modified bitumen may contain other known polymeric compounds which are known as improvers for bitumeniferous binders and mixtures. Examples of these polymers are polyolefines such as polyethylene and polypropylene, ethylene/vinyl acetate copolymer, and acrylonitrile-/butadiene/styrene copolymer.

The term "bitumen" as used in the context of the present invention includes all bitumens which may be used as fillers, sealants, or coating compounds, in road building or roofing.

Having now generally described this invention, a further understanding can be obtained by reference to certain specific examples which are provided herein for purposes of illustration only and are not intended to be limiting unless otherwise specified.

Note: The molecular weights given were obtained from the $$\eta_{sp}/c$$

values, with the aid of the following relation (where "Grad C" is ° C.):

$$\eta_{sp}/c \text{ (Chloroform, 20 Grad C)} = 0.0156 \, M_w^{0.645}$$

EXAMPLE 1

Into a 15-liter steel vessel equipped with stirring means, reflux condenser, interior thermometer, and heating by oil circulation, 4,900 g isodecyl methacrylate, 50 g methacrylic acid, and 50 g dimethylaminoethyl methacrylate were charged. The mixture was heated to 150° C. Addition of 150 g dry ice produced degassing. Addition of 6 g t-butyl perbenzoate initiated the polymerization. After 3 hours from the time of addition of the initiator, the mixture was thinned with 2,500 g of a naphthenic lubricating oil of viscosity 8.5 sg mm/sec at 100° C. Then the temperature of the vessel was increased to 100° C. and an additional 6 g t-butyl perbenzoate was added. After an additional 10 hours, an additional 2,500 g lubricating oil was added, to thin the mixture to a concentration of 50%. The resulting polymer had the following characteristics:

$\eta_{sp}/c$ (chloroform, 20° C.) = 97 ml/g.
Mw = 760,000 g/mol (by the calibration relation).
Conversion = 98.6%.

Then 80 g of the polymer solution was added at 150° C. to 1,000 g of type B 200 bitumen. After stirring 1 hour in a round bottom flask with a sickle-shaped stirrer at 150° C., the polymer was completely dissolved. The resulting polymer-modified bitumen was homogenous.

EXAMPLE 2

Into a 4-liter flask vessel equipped with stirring means, interior thermometer, and reflux condenser, 600 g n-octane, 588 g isodecyl methacrylate, 6 g methacrylic acid, and 6 g dimethylaminoethyl methacrylate were charged. The mixture was heated to 85° C. by means of an oil bath. After nitrogen was passed through the mixture for 1 hr, 1.2 g t-butyl peroctoate was added. After 3 hr another 1.2 g t-butyl peroctoate was added. After a total of 10 hr, the polymerization was terminated. The polymer was then precipitated by pouring the octane solution into ethanol, and was dried. The resulting polymer had the following characteristics:

$\eta sp/c$ (chloroform, 20° C.) = 68 ml/g.
Mw = 439,000 g/mol (by the calibration relation).
Conversion = 99.5%.

Then 80 g of the isolated and dried polymer was added at 150° C. to 1,000 g of type B 80 bitumen. After 1 hr of stirring in a round-bottom flask with a sickle-shaped stirrer at 150° C., the polymer was completely dissolved. The resulting polymer-modified bitumen was homogeneous.

EXAMPLE 3

Into a 4-liter flask equipped with stirring means, interior thermometer, and reflux condenser, 180 g of a naphthenic lubricating oil (viscosity at 100° C. =8.5 sq mm/sec), 999.6 g isodecyl methacrylate, 10.2 g methacrylic acid, and 10.2 g 3-dimethylamino-2,2-dimethylpropyl-1-methacrylate were charged. The mixture was heated to 75° C.

After nitrogen was passed through the mixture for 1 hr to degas the mixture, 0.61 g t-butyl perpivalate and 0.61 g t-butyl perbenzoate were added. After 4 hr the mixture was thinned with 840 g naphthenic lubricating oil. After an additional 1.5 hr, another 2 g t-butyl perbenzoate was added. After a total of 11 hr, the polymerization was terminated. The resulting polymer had the following characteristics:

$\eta$sp/c (chloroform, 20° C.) =97 ml/g.
Mw =760,000 g/mol (by the calibration relation).
Conversion =97%.

Then 80 g of the polymer solution was added at 150° C. to 1,000 g of type B 200 bitumen. After 1 hr the mixture was completely dissolved. The resulting polymer-modified bitumen was homogeneous.

EXAMPLE 1

Production of a polyisodecyl methacrylate

Into a 500-ml four-necked flask equipped with interior thermometer, sickle-shaped stirrer, and reflux condenser, 160 g n-decyl methacrylate and 40 g n-octane were charged. The mixture was heated to 85° C. by means of an oil bath. After the 85° C. temperature was reached, nitrogen was passed through the mixture to degas the mixture, following which 0.32 g t-butyl peroctoate was added.

After 2 hr the mixture was thinned with 28.6 g n-octane, and after another 1 hr another 0.32 g t-butyl peroctoate was added. After 16 hr total polymerization time, the polymer was isolated by pouring the solution into ethanol, and then the polymer was dried. The resulting polymer had the following characteristics:
$\eta$sp/c =90 ml/g.
Mw (measured by light scattering) =710,000 g/mol.

Then 40 g of the polymer was dissolved in 960 g of B 200 bitumen and further processed as in Example 1 to produce a polymer-modified bitumen. The resulting modified bitumen was homogeneous.

COMPARISON EXAMPLE 2

Production of a polyisodecyl methacrylate

Into a 500-ml four-necked flask 15 g of a naphthenic lubricating oil (viscosity at 100° C. =11.5 sq mm/sec) and 85 g isodecyl methacrylate were charged. The mixture was heated to 85° C. Then nitrogen was passed through the mixture 0.5 hr to degas the mixture, and 0.17 g t-butyl peroctoate was added. A mixture of 45 g naphthenic oil, 255 g isodecyl methacrylate, and 0.5 g t-butyl peroctoate was added gradually over a period of 3 hr, using a dosing pump. After 16 hr the polymerization was terminated. The viscosity of the solution was 4560 mPa at 150° C. The resulting polymer had the following characteristics:

$\eta$sp/c (chloroform, 20° C.) =88 ml/g.
Mw (measured by light scattering) =695,000 g/mol.

Then 80 g of the polymethacrylate solution was dissolved in 1000 g of B 200 bitumen at 150° C., with stirring 1 hr.

COMPARISON EXAMPLE 3

Production of a polyisodecyl methacrylate

Analogously to Example 1, 222 g isodecyl methacrylate, 3 g methyl methacrylate, and 275 g n-octane were charged to the reaction vessel, the mixture was heated to 85° C., and degassing was accomplished with carbon dioxide ice. Then 0.45 g t-butylperoctoate was added. After 3 hr an additional 0.45 g t-butylperoctoate was added. The total polymerization time was 16 hr. By pouring the mixture into ethanol, the polymer was isolated, followed by drying. The resulting polymer had the following characteristics:

$\eta$sp/c (chloroform, 20° C.) =55 ml/g.
Mw (measured by light scattering) =340,000 g/mol.

Then 60 g of the isolated polymethacrylate was dissolved in 1000 g of B 80 bitumen at 150° C., by stirring 1 hr.

The data obtained on the polymers and PmBs produced according to Examples 1-3 and Comparison Examples 1-3, as well as data on the bitumen types employed, are given in the following table.

| Polymer Modified Bitumen B-Type | Viscosity $\eta$sp/C of the Polymer | SP °C. | Pene 0.1 mm | Failure Point °C. | Ductility (cm) 25° C. | 13° C. | 7° C. | Elastic Restoration |
|---|---|---|---|---|---|---|---|---|
| Example 1 | 97 | 40 | 231 | −26 | | >100 | >100 | 67%[1] |
| Example 2 | 68 | 52 | 79 | −19 | | >100 | | 52%[1] |
| Example 3 | 98 | 40 | 197 | −27 | | | >100 | 70%[1] |
| Comparative Example 1 | 90 | 43 | 132 | −29 | | | >100 | 25%[1] |
| Comparative Example 2 | 88 | 47 | 105 | −27 | | >100 | | 34%[1] |
| Comparative Example 3 | 55 | 51 | 74 | −17 | | >100 | | 11%[1] |
| Bitumen | | | | | | | | |
| B 200 | | 39 | 190 | −18 | >100 | | | 0%[2] |
| B 80 | | 49 | 88 | −16 | >100 | | | 1%[1] |

SP = Softening Point, Ring and Kugel, DIN 52011
Pene = Penetration (Needle), DIN 52010
Failure Point (Fraas), DIN 52010
Ductility, DIN 52013
Elastic Restoration:
[1]modif. DIN 52013
[2]Methode der Torsionsruckverformung nach Esser, Strassen-und Tiefbau, Heft 4, 1962, S. 342 bzw. Thompson, Hagman, Proc. AAPT 27 (1958) S. 494

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A polymer-modified bitumen (PmB) having improved elastic restoration and having a content of 0.5-20 wt. % of polymer components in bitumen which polymer components are comprised to the extent of at least 20 wt. % of polyalkyl (meth)acrylates having molecular weights greater than 30,000, said polyalkyl (meth)acrylate being comprised of:
   50-99.8 wt. % of alkyl (meth)acrylates having alkyl groups of 8-26 C atoms;
   0.1-2.8 wt. % of polymerizable carboxylic acid monomers;
   0.1-2.8 wt. % of polymerizable basic nitrogen compounds; and
   0-49.8 wt. % of one or more other polymerizable compounds each having not more than one polymerizable double bond.

2. The polymer-modified bitumen according to claim 1, wherein the polyalkyl (meth)acrylate is comprised of units of alkyl (meth)acrylates with the alkyl groups having 8-18 C atoms, in the amount of 50-99.8 wt. % of said alkyl (meth)acrylate units.

3. The polymer-modified bitumen according to claim 1, wherein the polyalkyl (meth)acrylate is comprised of:
   0.2-2.5 wt. % of polymerizable carboxylic acids; and
   0.2-2.5 wt. % of polymerizable basic nitrogen compounds.

4. The polymer-modified bitumen according to claim 3, wherein the polyalkyl (meth)acrylate is comprised of 0.5-2.0 wt. % of polymerizable carboxylic acids and 0.5-2.0 wt. % of polymerizable basic nitrogen compounds.

5. The polymer-modified bitumen according to claim 1, wherein the polymeric additive is comprised exclusively of alkyl (meth)acrylate copolymers.

6. The polymer-modified bitumen according to claim 1, wherein the polyalkyl (meth)acrylate is a copolymer comprised of comonomer units of alkyl (meth)acrylates, polymerizable carboxylic acids, and polymerizable basic nitrogen compounds.

7. The polymer-modified bitumen according to claim 1, wherein the polyalkyl (meth)acrylate is a mixture of copolymers comprised of units of alkyl (meth)acrylates and polymerizable carboxylic acids and/or polymerizable basic nitrogen compounds.

8. The polymer-modified bitumen according to claim 1, wherein the elastic restoration is at least 50 percent.

9. The polymer-modified bitumen according to claim 1, wherein said polyalkyl (meth)acrylates are prepared from n-octylmethacrylate, 2-ethylhexyl(meth)acrylate, n-decyl methacrylate, isodecyl acrylate, isodecyl methacrylate, dodecyl methacrylate, octadecyl(meth)acrylate, eicosyl methacrylate and tricosyl methacrylate.

10. The polymer-modified bitumen according to claim 6, wherein said acidic or basic comonomer is present in an amount of 0.2 to 2.5 wt. %.

11. The polymer-modified bitumen according to claim 10, wherein said acidic or basic comonomer is present in an amount of 0.5 to 2.0 wt. %.

12. The polymer-modified bitumen according to claim 1, wherein said acid monomer is maleic acid, maleic anhydride, crotonic acid or itaconic acid alone or in combination with acrylic acid and/or methacrylic acid.

13. A method of improving the elastic restoration of a bitumen, comprising adding to said bitumen 0.5-20 wt. % of polymer components, which polymer components are comprised to the extent of at least 20 wt. % of polyalkyl(meth)acrylates having molecular weights greater than 30,000, said polyalkyl(meth)acrylates being comprised of:
   50-99.8 wt. % of alkyl(meth)acrylates having alkyl groups of 8-26 carbon atoms;
   0.1-2.8 wt. % of polymerizable carboxylic acids;
   0.1-2.8 wt. % of polymerizable basic nitrogen compounds; and
   0-49.8 wt. % of one or more other polymerizable compounds each having not more than one polymerizable double bond.

* * * * *